T. W. Shepard.
Potato Digger.
No. 72552
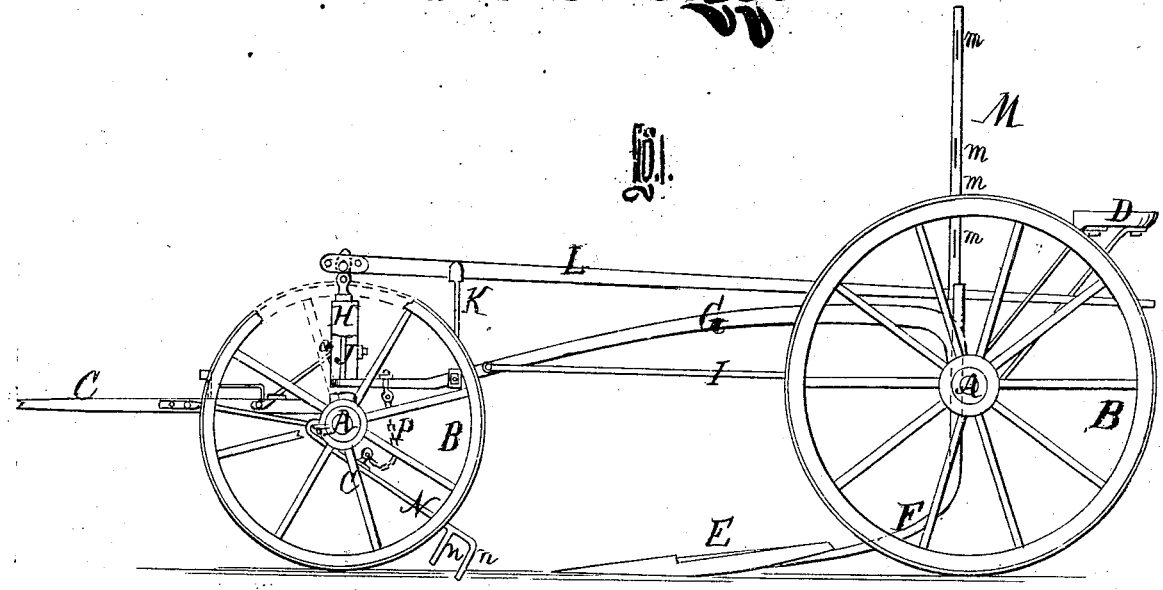
PATENTED DEC 24 1867
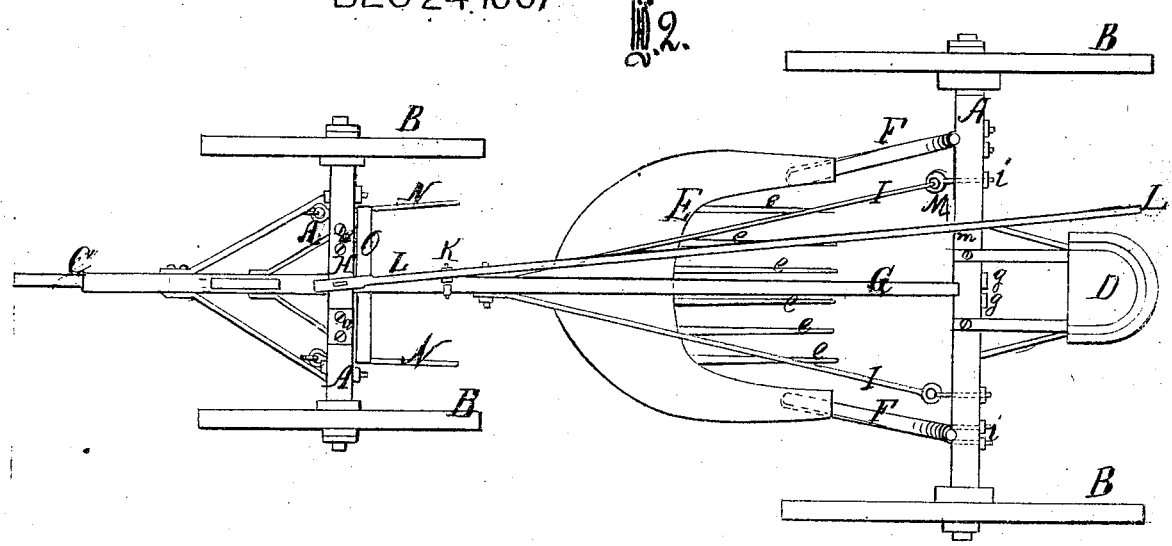
Witnesses:
S. C. Kenion
C. A. Pettis
Inventor:
T. W. Shepard
By Munn & Co.
Attorneys

United States Patent Office.

THOMAS W. SHEPARD, OF HENNEPIN, ILLINOIS.

*Letters Patent No. 72,552, dated December 24, 1867.*

IMPROVEMENT IN POTATO-DIGGER.

*The Schedule referred to in these Letters Patent and making part of the same.*

TO ALL WHOM IT MAY CONCERN:

Be it known that I, THOMAS W. SHEPARD, of Hennepin, in the county of Putnam, and State of Illinois, have invented a new and improved Potato-Digger; and I do hereby declare the following to be a full, clear, and exact description of the same, sufficient to enable those skilled in the art to which my invention appertains to make use of it, reference being had to the accompanying drawings, forming part of this specification, in which—

Figure 1 is a side elevation, and

Figure 2 a top view.

In this invention a new form of mould or plough is used, and a new arrangement for regulating it, by which greater results are obtained with less power than in any other machine for the purpose.

In the drawings, A A represent the axles; B, the wheels; C, the draught-beam; and D, the driver's seat, as constructed and used in my improved apparatus. The mould-plough or shovel, E, is of peculiar form, being constructed of a single plate of steel, shaped somewhat like a horse-shoe, and provided with longitudinal arms, $e\ e\ e$, which project back from the rear edge of the front portion of the plough across the central space, their ends coming about even with the rear ends of the steel shovel-plate. The upper side of the shovel-plate is convex, although its convexity is small, being only enough to raise the arms $e\ e\ e$ slightly from the ground, so that the dirt will fall through them. The less the elevation with which this can be best accomplished, the less the convexity of the shovel. The front or cutting-edge of the shovel is sharp, and extends around horizontally. The rear ends of the shovel-plate are affixed to bent supporting-rods, F F, which pass through staples in the rear axle-tree, and thus hold the shovel or plate in position. The plough may be adjusted higher or lower, as may be desired. The forward axle-tree is provided with high shoulders, $a\ a$, on either side of the king-bolt. The latter, shown at J, extends vertically between the shoulders passing through the axle-tree, and through a bridge or yoke, H, that connects the upper edges of the shoulders. G is a reach, bent in the form shown clearly in fig. 1, and connecting the forward and rear axles. The king-bolt passes through a hole in its forward end, leaving that end free to move up and down in the space between the bridge H and the axle. The rear end of the reach is bent down, and passes through two staples, $g\ g$, which are secured or held by nuts to the rear axle. To make the rear steadier, a vertical gain may be cut in the forward side of the rear axle, and the reach may be confined in it by the staples, as shown in fig. 2. Braces, I I, extend from the sides of the reach, bear its forward end to eye-bolts, $i\ i$, fastened by nuts to the rear axle. By adjusting the eye-bolts in or out on either side, the forward end of the reach may be adjusted to the one side or the other, when desired. The king-bolt projects a short distance above the bridge H, forming a fulcrum, upon which is pivoted a lever, L, that extends back to the driver's seat. A swinging arm, K, extends from the lever down to the reach, being jointed to each, and supporting the forward end of the reach. The driver, in his seat, by moving the lever up or down, can raise the forward end of the reach, and thus lift the plough E out of the ground, or depress the reach and set the plough further in the ground. A post, M, projects upward from the axle near the driver's seat, and is provided with notches or rests, $m\ m$, which will support the lever L, and through it the plough E, in any required position. Two arms, N N, connected by a cross-bar, O, and provided with teeth, $n\ n$, are hinged to the under side of the forward axle-tree, and reach backward, downward, and slightly outward. A chain, P, extending from the reach G to the cross-bar O, supports the arms N N, and enables the driver to elevate or depress them at the same time that he raises or lowers the plough E. The function of these arms is to gather the potato-vines in towards the hills, separating them from those of the adjoining rows, and enabling them to pass freely over the plough E.

Having thus prepared the vines, the plough E passes under the hill, opening it, and sifting the dirt from the vines through the rods $e\ e\ e$, discharges the vines, with the potatoes still clinging to them, over the rear ends of the rods in uniform rows. It is only necessary then to separate the fruit from the stalks.

This machine has been thoroughly tried, and has proved itself superior to any other machine in use, working easily and rapidly, without cutting the potatoes, and with the application of but little power.

Having thus described my invention, what I claim as new, and desire to secure by Letters Patent, is—

1. I claim the plough E, when constructed with the horizontal sharp edge, the convex upper surface, the bars $e\ e\ e$ and the supporting-rods F F, the main portion of the plough consisting of a steel plate of the crescent form shown and described, when all the parts of said plough are constructed, combined, and arranged substantially as and for the purpose set forth.

2. I claim the device, consisting of the arms N N, teeth *n n*, cross-bar O, or its equivalent, and chain P, for the purposes above set forth.

3. I claim the method of regulating and adjusting the plough E, as above described, by combining the plough, the rear axle, the swinging reach G, and the lever L, substantially in the manner set forth.

THOMAS W. SHEPARD.

Witnesses:
    CHAS. A. PETTIT,
    S. C. KEMON.